(12) United States Patent
Delaney et al.

(10) Patent No.: US 7,909,400 B1
(45) Date of Patent: Mar. 22, 2011

(54) MODULAR CHILD SAFETY SEAT FOR VEHICLES

(76) Inventors: Todd Delaney, Berwyn, PA (US);
Tamara Davis, Berwyn, PA (US)

(*) Notice: Subject to any disclaimer, the term of this patent is extended or adjusted under 35 U.S.C. 154(b) by 12 days.

(21) Appl. No.: 11/731,821

(22) Filed: Apr. 2, 2007

(51) Int. Cl.
B60N 2/28 (2006.01)
A47C 1/11 (2006.01)
A47C 1/08 (2006.01)

(52) U.S. Cl. ............ 297/256.16; 297/250.1
(58) Field of Classification Search .......... 297/250.1, 297/219.12, 228.1, 229, 256.16, 452.14
See application file for complete search history.

(56) References Cited

U.S. PATENT DOCUMENTS

| 2,888,976 A | * | 6/1959 | Hart | 297/256.11 |
| 3,259,425 A | * | 7/1966 | Chitwood | 297/148 |
| 3,575,465 A | * | 4/1971 | Dolby et al. | 297/118 |
| 3,934,934 A | * | 1/1976 | Farrell et al. | 297/467 |
| 4,275,923 A | * | 6/1981 | Molnar | 297/250.1 |
| 4,750,783 A | * | 6/1988 | Irby et al. | 297/256.16 |
| 4,775,183 A | * | 10/1988 | Tsuge et al. | 297/219.12 |
| 5,121,965 A | * | 6/1992 | Skold et al. | 297/256.1 |
| 5,123,699 A | * | 6/1992 | Warburton | 297/219.1 |
| 5,265,931 A | * | 11/1993 | Ryan | 297/130 |
| 6,000,753 A | * | 12/1999 | Cone, II | 297/256.16 |
| 6,089,661 A | * | 7/2000 | Åstrom | 297/237 |
| 6,193,312 B1 | * | 2/2001 | Yoshida et al. | 297/256.16 |
| 6,467,840 B1 | * | 10/2002 | Verbovszky et al. | 297/219.12 |
| 6,481,794 B1 | * | 11/2002 | Kassai et al. | 297/250.1 |
| 6,616,226 B2 | * | 9/2003 | Yanagihara | 297/250.1 |
| 6,676,213 B1 | * | 1/2004 | Dlugos | 297/256.11 |
| 6,736,415 B1 | * | 5/2004 | Lenihan | 280/47.19 |
| 6,796,606 B2 | * | 9/2004 | Marshall | 297/182 |
| 6,857,700 B2 | | 2/2005 | Eastman et al. | 297/250.1 |
| 2005/0242642 A1 | * | 11/2005 | Kespohl | 297/256.1 |

* cited by examiner

Primary Examiner — David Dunn
Assistant Examiner — Tania Abraham
(74) Attorney, Agent, or Firm — LaMorte & Associates, P.C.

(57) ABSTRACT

A child safety seat system and the corresponding method of using a modular child safety seat assembly to compensate for the stature changes of a growing child. The child safety seat system utilizes a base shell that is strapped into an automobile using the automobile seat belt restraints. A plurality of interchangeable seating inserts are provided. Each of the seating inserts has a cushioned seat. The thickness of the cushioning used depends upon the targeted age of a child and is engineered to maintain the child's shoulders within a specific range of heights relative to the base shell. An attachment mechanism is used to attach a selected seating insert to the base shell. As a child outgrows a seating insert, that seating insert is removed from the base shell and is replaced with a seating insert sized for a larger child.

7 Claims, 4 Drawing Sheets

MODULAR CHILD SAFETY SEAT FOR VEHICLES

BACKGROUND OF THE INVENTION

1. Field of the Invention

In general, the present invention relates to after-market child safety seats that are designed for use in automobiles. More particularly, the present invention relates to child safety seats having features that enable the seat to be modified in size as a child grows.

2. Prior Art Description

All modern automobiles are required to have seat belt restraints with shoulder straps for all of the seats in that vehicle. The seat belt restraints, however, are designed to fit an average sized adult passenger. Accordingly, the shoulder straps of the seat belt restraint do not fit properly over a small child. If a seat belt restraint does not fit properly, it will not work as it should during an accident.

Recognizing that seat belt restraints do not fit small children, most states have passed laws requiring that small children traveling in vehicles be seated in a child safety seat. Child safety seats are seats that are placed inside a vehicle on top of the regular vehicle seat. The child safety seat either contains its own restraints that are sized for a child, or elevate a child into a position where the vehicle's seat belt restraints are properly positioned on the child.

Many states require that child safety seats be used until a child turns eight years old and/or reaches 80 pounds or 57 inches. Between birth and the age of eight, children grow rapidly. It is therefore difficult to design a safety seat that properly fits a child throughout that child's first eight years of life. Rather, what has become commonplace, is that parents use different types of child seats during different parts of a child's life. For instance, when a child is first born, the child is usually transported in an infant carrier that also serves as a vehicle child safety seat. Once a child reaches the age of one, a parent buys a toddler child safety seat. Toddler child safety seats have adjustable restraints that can be configured to hold a child between the ages of one and three years. Toddler child safety seats are exemplified by U.S. Pat. No. 6,857,700 to Eastman, entitled Adjustable Child Seat For Toddlers To Small Children.

Once a child reaches the size of a typical four year old, the child typically is placed in a booster seat. The booster seat often does not have its own restraints, but rather elevates a child so that the seat belt restraints within the vehicle are properly positioned across the child's body.

It will therefore be understood, that a parent of a child can expect to purchase at least three different child safety seats for a child, before that child turns eight year old. This costs a significant amount of money. Furthermore, due to procrastination of parents, many children sit in undersized seats that do not provide adequate crash protection.

Furthermore, although infant seats and many toddler child safety seats provide protection for the side of a child, many booster seats do not. Booster seats elevate older children so that they can utilize the shoulder straps that come equipped in the vehicle. Booster seats tend not to have side panels because the presence of side panels would prevent the shoulder straps from lying properly across the torso of a child. Consequently, during an accident, booster seats do not provide any side impact protection.

A need therefore exists for an improved child safety seat that is modular in its construction and provides proper protection to a child from newborn to the age of eight. This need is met by the present invention as described and claimed below.

SUMMARY OF THE INVENTION

The present invention is a child safety seat system and the corresponding method of using a modular child safety seat assembly to compensate for the stature changes of a growing child. In this manner only one child safety seat system needs to be purchased for a growing child.

The child safety seat system utilizes a base shell that is strapped into an automobile using the seat belt restraints of that automobile.

A plurality of interchangeable seating inserts are provided. Each of the seating inserts has a cushioned seat and a cushioned backrest. The thickness of the cushioning used depends upon the targeted age of a child and is engineered to maintain the child's shoulders within a specific range of heights relative to the base shell.

An attachment mechanism is used to attach a selected seating insert to the base shell. As a child outgrows a seating insert, that seating insert is removed from the base shell and is replaced with a larger seating insert. Once the child outgrows the need for a child safety seat, the base shell is removed and the seating inserts can be used directly as booster seats.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention child safety seat can be used in an airplane, train, boat or any other vehicle, it is primarily designed for use in an automobile. Accordingly, by way of example, the present invention child safety seat will be described in use within an automobile in order to set forth the best mode contemplated for the invention. However, the use of the present invention child safety seat in an automobile should not be considered a limitation upon the claims.

Figure 1:
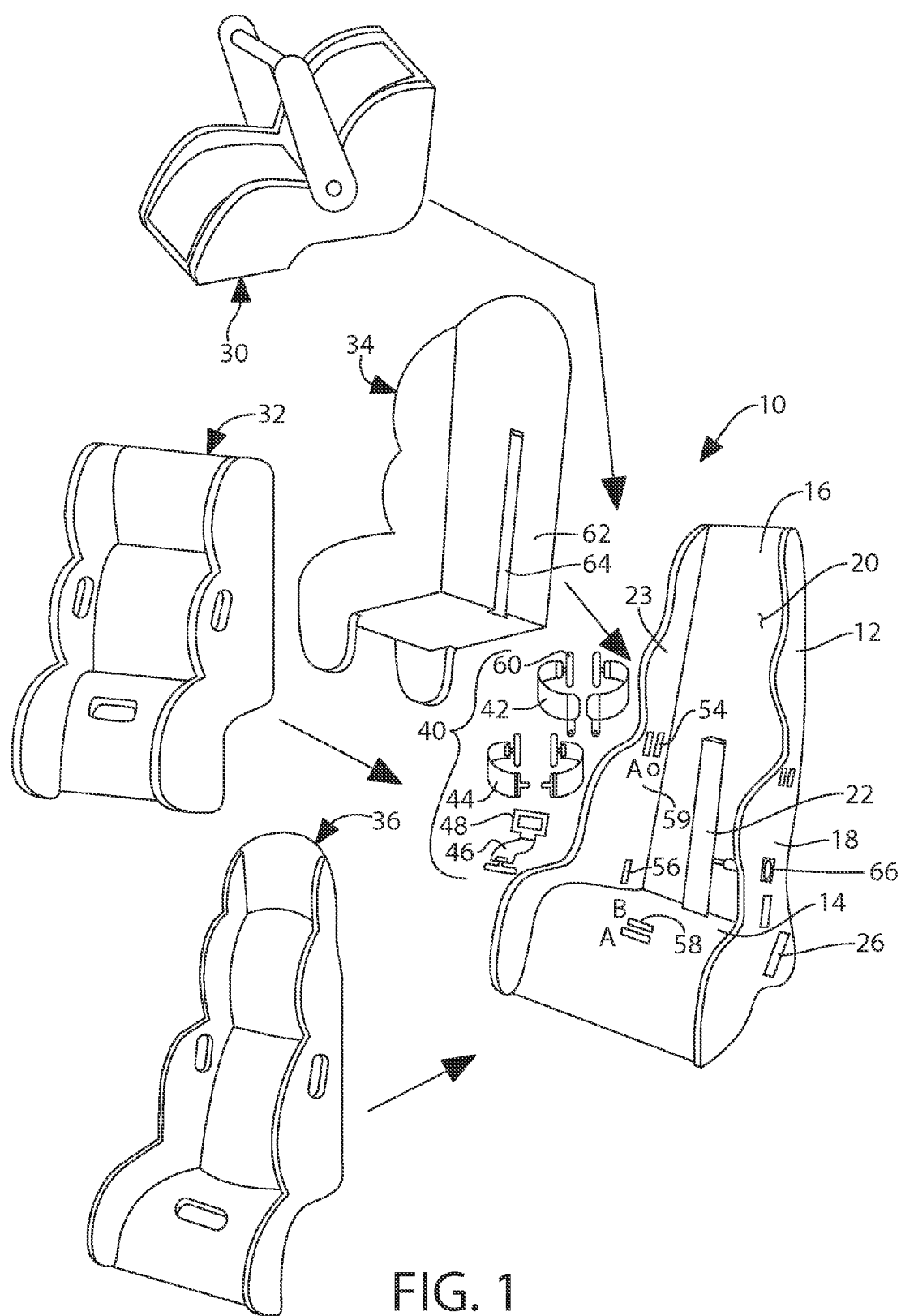
FIG. 1 is an exploded perspective view of an exemplary embodiment of the present invention child safety seat system.

Referring to FIG. 1, an exemplary embodiment of a modular child safety seat system 10 is shown in accordance with the present invention. The modular child safety seat system 10 includes a base shell 12. The base shell 12 is preferably a molded unit having a bottom surface 14, a back surface 16 and two side panels 18. The bottom surface 14, the back surface 16 and the two side panels 18 combine to define a central seat receptacle 20. A will be later explained, the central seat receptacle 20 is sized to receive a plurality of seating inserts 30, 32, 34, 36 that can be interchanged, as required, to match the size of the child to be seated.

A seat mounting rail 22 is present on the back surface 16 of the base shell 12. The seat mounting rail 22 is a shaped rail with a dovetail shape or some similar shape that enables the rail to engage a complementary shaped slot that is passed onto the rail. As will later be explained, the seat mounting rail 22 is used to join one of the seating inserts 30, 32, 34, 36 to the base shell 12.

The side panels 18 of the base shell 12 are shaped to provide side impact protection during a collision. The side panels 18 are contoured, having extending sections 23 that are meant to surround and protect the head and torso of a passenger. Since the side panels 18 of the base shell 12 have specific protective areas, it is important that the head of a child be located within a specific height range relative to the back surface 16 of the base shell 12. As will later be explained, the positioning of a child's head, relative to the base shell 12 is determined by the seating insert 30, 32, 34, 36 that is selected and joined to the base shell 12.

The base shell 12 contains seat belt apertures 26 that enable the seat belt from the vehicle to pass through the structure of the base shell 12 and bind the base shell 12 in place on a seat of a vehicle. Alternatively, the base shell 12 may come with its own straps that enable it to mechanically connect with the seat in a vehicle.

A five point restraint assembly 40 is provided. The five point restraint assembly 40 includes two shoulder straps 42, two lap belt straps 44, and a central strap 46. It is preferred that the shoulder straps 42 and the lap belt straps 44 have a folded configuration that enables these components to be adjusted in length.

The central strap 46 is attached to a connection buckle 48. The two shoulder straps 42 and the two lap belt straps 44 all terminate with clips 50 that are selectively engaged by the connection buckle 48. The connection buckle 48 contains a release button 52 that causes the connection buckle 48 to release the shoulder straps 42 and lap belt straps 44 when pressed.

A plurality of attachment slots 54, 56, 58 are formed into the structure of the base shell 12. There are shoulder attachment slots 54 for the shoulder straps 42, lap attachment slots 56 for the lap belt straps 44 and central attachment slots 58 for the central strap 46. Indicia 59 may be molded into the base shell 12 next to the various attachment slots 54, 56, 58 that indicates a recommended setting for a child of a particular size and weight.

In the shown embodiment, the shoulder straps 42, lap belt straps 44 and central strap 46 all have an anchor clip 60 at a bottom termination. The anchor clips 60 are sized and oriented to pass into the various attachment slots 54, 56, 58 and engage the attachment slots 54, 56, 58. It will therefore be understood that the positions of the shoulder straps 42, lap belt straps 44 and central strap 46 can be changed, thereby making the five point restraint assembly 40 adjustable to average sized children between the ages of two and ten.

The use of anchor clips 60 and attachment slots 54, 56, 58 are only one way that the straps of the five point restraint assembly 40 can be adjusted. It will be understood that the configuration illustrated is merely exemplary and that many other adjustment mechanisms can be used. The prior art contains many five point restraint systems for various types of seats. Many of these prior art restraint systems have proprietary adjustment devices. It will be understood that many prior art adjustment devices can be adapted for use as part of the present invention.

By way of example, there are four seating inserts 30, 32, 34, 36 illustrated in FIG. 1. The four seating inserts include an infant seating insert 30, and seating inserts 32, 34, 36 for a small, medium and large child, respectively. The four seating inserts 30, 32, 34, 36 can be used to accommodate a child from birth through the age of eight. However, the use of four seating inserts is merely exemplary. The present invention child safety seat system 10 can be sold without an infant seating assembly 30. As such, the safety seat system 10 would be intended only for children between the ages of two and eight. Similarly, the safety seat system 10 can be sold with eight different seating inserts, wherein a parent would change the seating insert each year as a child approaches the age of eight.

Regardless of how many seating inserts are provided. Each seating insert 30, 32, 34, 36 has a rear surface 62. A slot 64 is formed in the rear surface 62 of each seating insert 30, 32, 34, 36. The slot 64 is shaped to mate with the seat mounting rail 22 present in the base shell 12. It will therefore be understood, that in order to attach one of the seating inserts 30, 32, 34, 36 to the base shell 12, the slot 64 in the rear surface 62 of the selected seating insert 30, 32, 34, 36 is advanced onto the seat mounting rail 22 in the base shell 12.

A locking mechanism 66 is provided that prevents the slot 64 in the rear surface 62 of a seating insert 30, 32, 34, 36 from being lifted off the seat mounting rail 22. The locking mechanism 66 is controlled through the manipulation of a lever or button 68 on a side panel 18 of the base shell 12.

Figure 2:
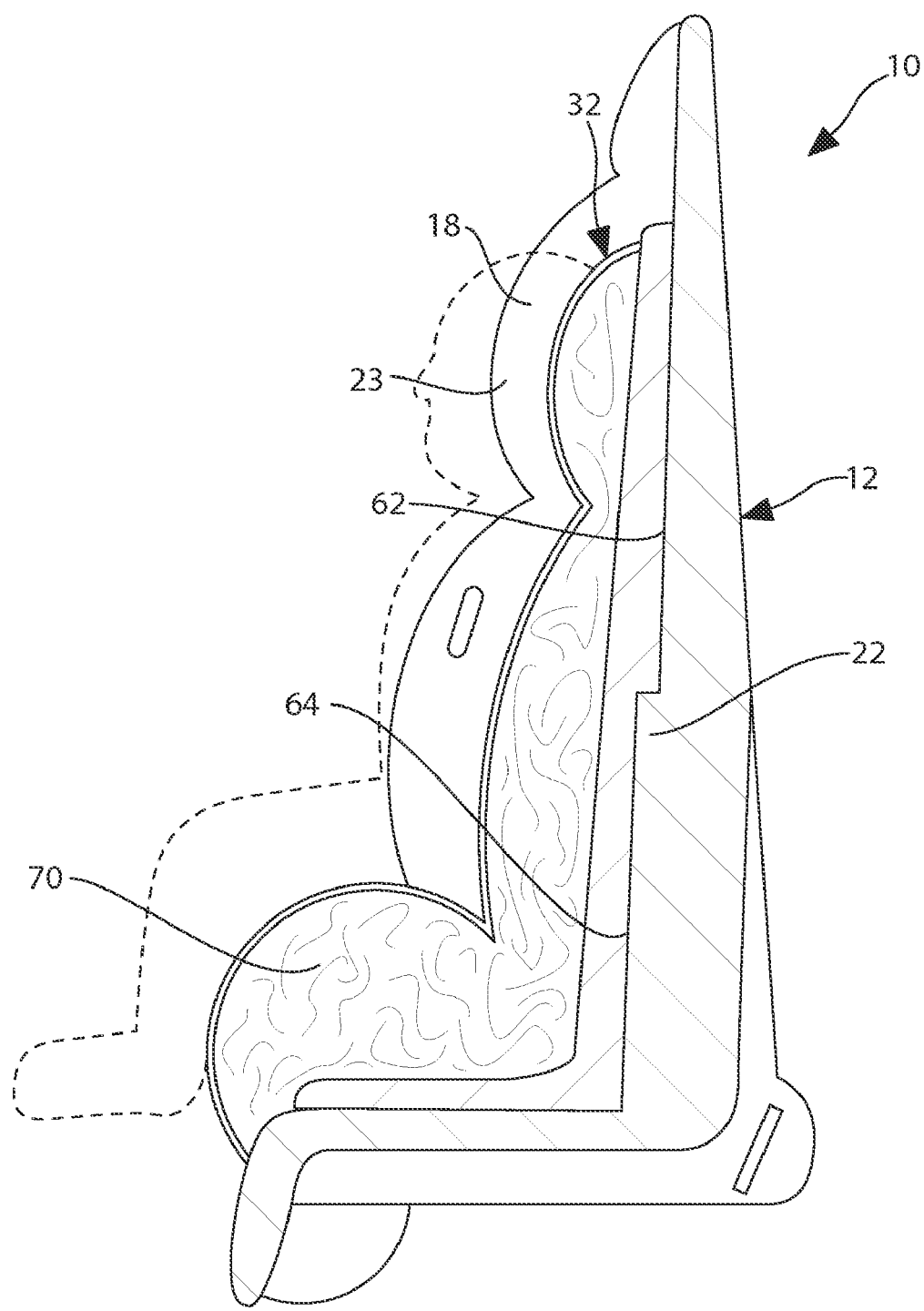
FIG. 2 is a cross-sectional view of the exemplary embodiment of FIG. 1, wherein a toddler seating insert is connected to the base shell.

Referring now to FIG. 2, the present invention child safety seat system 10 is shown holding seating insert 32 for a toddler. As can be seen, the toddler seating insert 32 is sized to support a child of a toddler's size. As has been previously explained, it is desired to support a child's head in between the extending head protection sections 23 of the side panels 18. Accordingly, sufficient seat cushioning 70 is provided so that the toddler is properly positioned relative to the structure of the base shell 12.

As can be seen, the seat mounting rail 22 on the base shell 12 is fully engaged with the slot 64 in the rear surface 62 of the seating insert 32. Consequently, the seating insert 32 and the base shell 12 cannot separate during an accident. This provides a stable support platform for the toddler during an accident.

Figure 3:
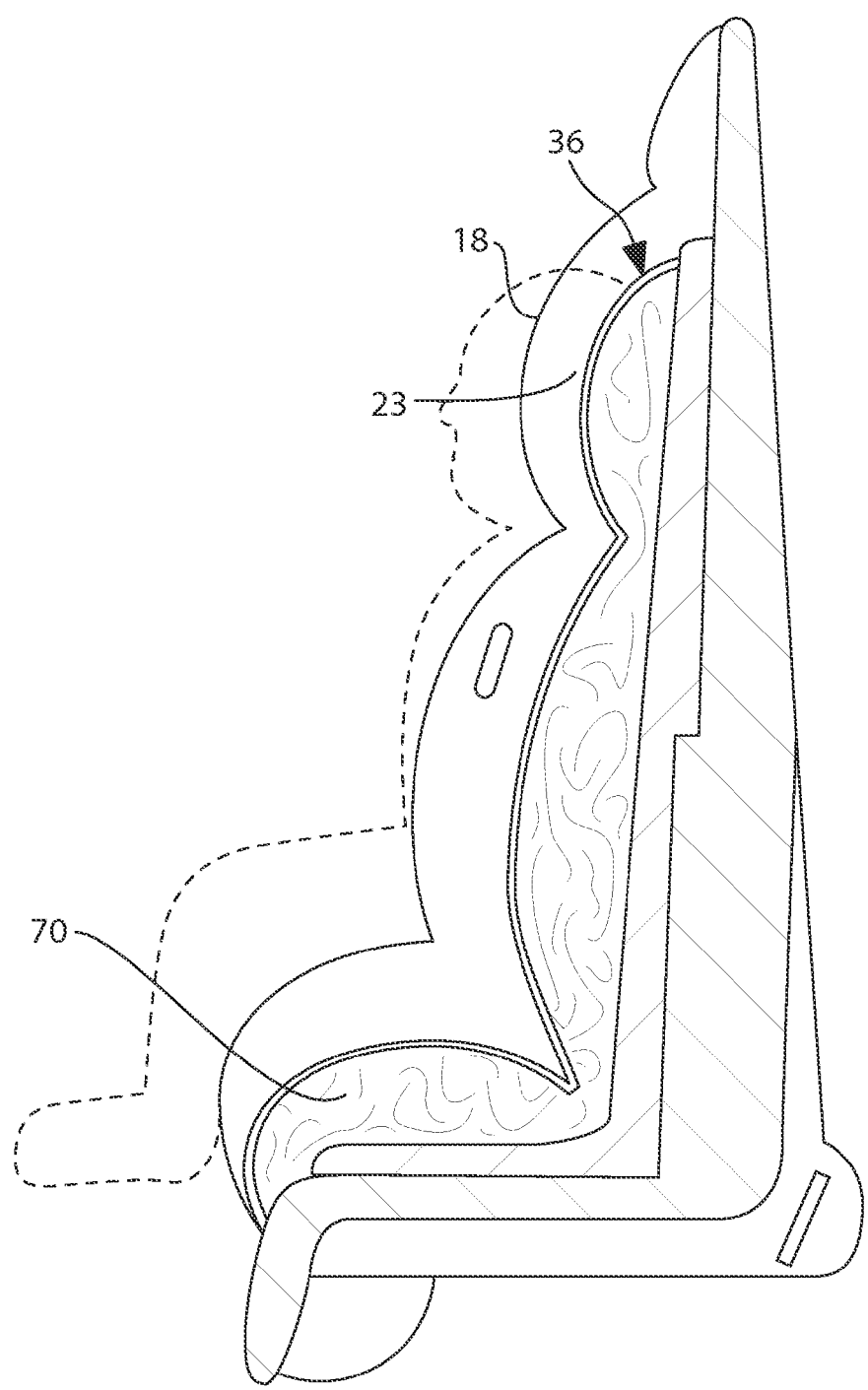
FIG. 3 is a cross-sectional view of the exemplary embodiment of FIG. 1, wherein a large child seating insert is connected to the base shell.

Referring to FIG. 3, it can be seen that the large child seating insert 36 has less seat cushioning 70 than do the smaller seating inserts. The thinner seat cushioning 70 is needed to lower the torso of the child so that the head of the toddler is properly positioned between the extending head protection sections 23 of the side panels 18.

Figure 4:
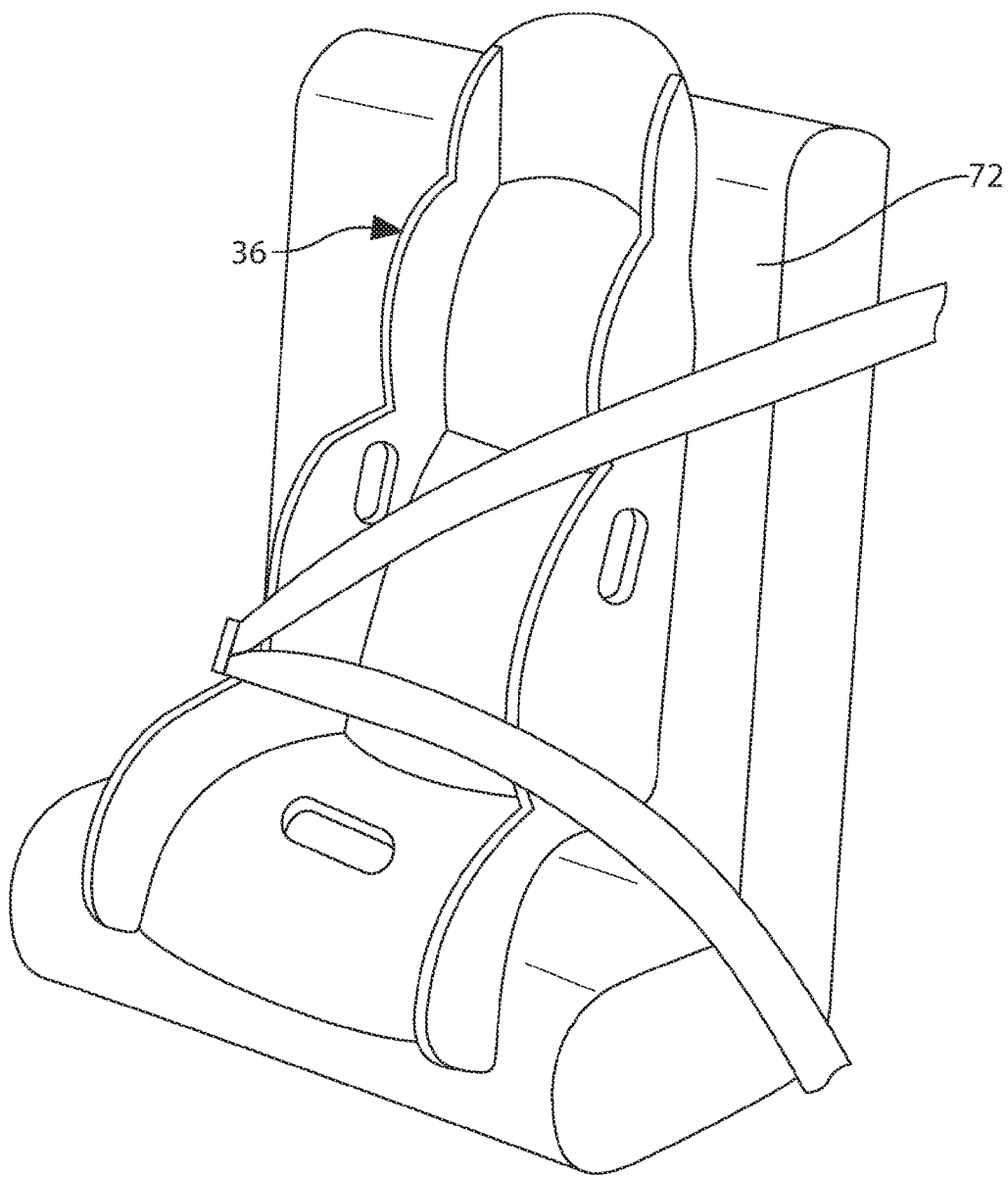
FIG. 4 is a perspective view of a large child seating insert resting independently directly upon the seat of an automobile.

After a child becomes too tall or too heavy for the full child safety seat system, it should be understood that any of the seating inserts can be used solely as a booster seat. Referring to FIG. 4, the largest seating insert 36 is shown placed directly upon the seat 72 of an automobile. The seating insert 36 elevates a child or a small pre-teen so that the shoulder straps 75 of the automobile properly pass across the shoulder of the child.

It will be understood that a person skilled in the art can make many variations to the illustrated embodiment of the present invention. In particular, the shape of the seat base and the seating inserts can be styled into a wide array of aesethically pleasing designs. Furthermore, the means for attaching the five point restraint assembly to the base shell can be varied, as can the attachment means used to connect the seating inserts to the base shell. All such variations, modifications and alternate embodiments are intended to be included within the scope of the present invention as described and claimed.

What is claimed is:

1. A method of adjusting a child safety seat to a child as that child grows larger, said method comprising the steps of:

providing a base shell having a rigid bottom surface, a rigid rear surface and side panels, said side panels having forwardly extending sections in a specific height range for providing head protection, wherein a seat receptacle is defined by said base shell;

providing restraints that are anchored to said base shell;

attaching said base shell to the seat of an automobile;

providing a plurality of seating inserts of different sizes, wherein said plurality of seating inserts includes a largest seating insert, and wherein each of said seating inserts is a different size for seating a child of a different size in a position where the head of the child is positioned within said specific height range between said extending sections of said side panels, and wherein each of said seating inserts has a rigid seat, a rigid backrest, and openings for said restraints to pass through each of said seating inserts and restrain a seated child;

selecting from among said plurality of seating inserts, a particular seating insert that is appropriate for a particular child;

attaching said particular seating insert to said base shell; and replacing said particular seating insert with a larger one from said plurality of seating inserts when the particular child outgrows said particular seating insert; and removing said base shell and seating a particular child in just said largest seating insert when the particular child grows to a predetermined physical stature.

2. The method according to claim 1, wherein at least some of said restraint straps are selectively adjustable in length.

3. The method according to claim 1, wherein said restraint straps attach to said base shell at anchor positions.

4. The method according to claim 3, wherein said anchor positions are selectively adjustable.

5. The method according to claim 1, wherein said plurality of interchangeable seating inserts includes an infant seating insert.

6. The method according to claim 1, wherein said base shell contains apertures through which a seat belt restraint system from an automobile can pass and attach said base shell to a seat within said automobile.

7. The method according to claim 1, wherein said step of attaching said particular seating insert to said base shell includes mechanically interconnecting said particular seating insert to said base shell.

* * * * *